(12) United States Patent
Jin et al.

(10) Patent No.: US 8,122,501 B2
(45) Date of Patent: Feb. 21, 2012

(54) TRAITOR DETECTION FOR MULTILEVEL ASSIGNMENT

(75) Inventors: Hongxia Jin, San Jose, CA (US); Jeffrey Bruce Lotspiech, Henderson, NV (US); Avinash Laxmisha Varna, Greenbelt, MD (US)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 12/143,061

(22) Filed: Jun. 20, 2008

(65) Prior Publication Data

US 2009/0320130 A1 Dec. 24, 2009

(51) Int. Cl.
*G06F 11/00* (2006.01)
*G06F 21/00* (2006.01)
*H04N 7/167* (2006.01)

(52) U.S. Cl. .............................. 726/22; 705/57; 380/210
(58) Field of Classification Search .................... 726/22; 705/57; 380/210
See application file for complete search history.

(56) References Cited

U.S. PATENT DOCUMENTS

| | | | |
|---|---|---|---|
| 4,041,249 A | 8/1977 | Matz et al. |
| 4,634,807 A | 1/1987 | Chorley et al. |
| 4,694,491 A | 9/1987 | Horne et al. |
| 4,864,616 A | 9/1989 | Pond et al. |
| 5,058,162 A | 10/1991 | Santon et al. |
| 5,065,429 A | 11/1991 | Lang |
| 5,081,677 A | 1/1992 | Green et al. |
| 5,177,791 A | 1/1993 | Yeh et al. |
| 5,247,497 A | 9/1993 | Cohn |
| 5,272,752 A | 12/1993 | Myers et al. |
| 5,345,505 A | 9/1994 | Pires |
| 5,412,723 A | 5/1995 | Canetti et al. |
| 5,592,552 A | 1/1997 | Fiat |
| 5,598,470 A | 1/1997 | Cooper et al. |
| 5,636,276 A | 6/1997 | Brugger |
| 5,651,064 A | 7/1997 | Newell |
| 5,668,873 A | 9/1997 | Yamauchi |
| 5,680,457 A | 10/1997 | Bestler et al. |
| 5,708,632 A | 1/1998 | Totsuka et al. |
| 5,734,719 A | 3/1998 | Tsevdos et al. |
| 5,754,648 A | 5/1998 | Ryan et al. |
| 5,754,649 A | 5/1998 | Ryan et al. |
| 5,796,824 A | 8/1998 | Hasebe et al. |
| 5,910,987 A | 6/1999 | Ginter et al. |

(Continued)

FOREIGN PATENT DOCUMENTS

WO    WO 99/19822    4/1999

(Continued)

OTHER PUBLICATIONS

Hongxia Jin, Jeffery Lotspiech, Stefan Nusser, Traitor Tracing for Prerecorded and Recordable Media, Oct. 2004, pp. 83-90.*

(Continued)

*Primary Examiner* — Philip Lee
(74) *Attorney, Agent, or Firm* — Donald Wenskay; Mohammed Kashef

(57) ABSTRACT

One embodiment of the present invention includes a method for traitor tracing that includes performing an inner code traitor tracing on a recovered pirated digital file, the recovered digital file incorporating an inner code for assigning segments of the digital file and an outer code for assigning inner codes to individual digital files. The method also includes extracting partial information regarding the outer code from the inner code tracing. An outer code tracing procedure may then be performed using the partial information.

13 Claims, 7 Drawing Sheets

408

U.S. PATENT DOCUMENTS

| | | | |
|---|---|---|---|
| 5,949,885 | A | 9/1999 | Leighton |
| 6,020,883 | A | 2/2000 | Herz et al. |
| 6,061,451 | A | 5/2000 | Muratani et al. |
| 6,118,873 | A | 9/2000 | Lotspiech |
| 6,134,201 | A | 10/2000 | Sako et al. |
| 6,209,092 | B1 | 3/2001 | Linnartz |
| 6,285,774 | B1 | 9/2001 | Schumann et al. |
| 6,289,455 | B1 | 9/2001 | Kocher et al. |
| 6,347,846 | B1 | 2/2002 | Nakamura |
| 6,370,272 | B1 | 4/2002 | Shimizu |
| 6,381,367 | B1 | 4/2002 | Ryan |
| 6,434,535 | B1 | 8/2002 | Kupka et al. |
| 6,442,108 | B1 | 8/2002 | Kurihara et al. |
| 6,442,626 | B1 | 8/2002 | Smola et al. |
| 6,535,858 | B1 | 3/2003 | Blaukovitsch et al. |
| 6,556,679 | B1 | 4/2003 | Kato et al. |
| 6,563,937 | B1 | 5/2003 | Wendt |
| 6,587,949 | B1 | 7/2003 | Steinberg |
| 6,604,072 | B2 | 8/2003 | Pitman et al. |
| 6,609,116 | B1 | 8/2003 | Lotspiech |
| 6,636,966 | B1 | 10/2003 | Lee et al. |
| 6,738,878 | B2 | 5/2004 | Ripley et al. |
| 6,760,445 | B1 | 7/2004 | Schwenk et al. |
| 6,760,539 | B2 | 7/2004 | Asada et al. |
| 6,775,779 | B1 | 8/2004 | England et al. |
| 6,802,003 | B1 | 10/2004 | Gross et al. |
| 6,832,319 | B1 | 12/2004 | Bell et al. |
| 6,839,436 | B1 | 1/2005 | Garay et al. |
| 6,856,997 | B2 | 2/2005 | Lee et al. |
| 6,857,076 | B1 | 2/2005 | Klein |
| 6,888,944 | B2 | 5/2005 | Lotspiech et al. |
| 6,901,548 | B2 | 5/2005 | Hattori et al. |
| 6,912,634 | B2 | 6/2005 | Ripley et al. |
| 6,947,563 | B2 | 9/2005 | Fagin et al. |
| 6,999,947 | B2 | 2/2006 | Utsumi et al. |
| 7,010,125 | B2 | 3/2006 | Lotspiech et al. |
| 7,036,024 | B2 | 4/2006 | Watson |
| 7,039,803 | B2 | 5/2006 | Lotspiech et al. |
| 7,046,808 | B1 | 5/2006 | Petrovic et al. |
| 7,057,993 | B2 | 6/2006 | Barnard et al. |
| 7,082,537 | B2 | 7/2006 | Muratani |
| 7,380,132 | B2 | 8/2006 | Irwin et al. |
| 7,120,901 | B2 | 10/2006 | Ferri et al. |
| 7,155,591 | B2 | 12/2006 | Ripley et al. |
| 7,162,646 | B2 | 1/2007 | Wu et al. |
| 7,215,636 | B2 | 5/2007 | Seo et al. |
| 7,283,633 | B2 | 10/2007 | Asano et al. |
| 7,296,159 | B2 | 11/2007 | Zhang et al. |
| 7,305,711 | B2 | 12/2007 | Ellison et al. |
| 7,319,752 | B2 | 1/2008 | Asano et al. |
| 7,346,169 | B2 | 3/2008 | Asano et al. |
| 7,380,137 | B2 | 5/2008 | Bell et al. |
| 7,392,392 | B2 | 6/2008 | Levy |
| 2002/0003881 | A1 | 1/2002 | Reitmeier et al. |
| 2002/0044320 | A1 | 4/2002 | Pfeiffer et al. |
| 2002/0104001 | A1 | 8/2002 | Lotspiech et al. |
| 2002/0141582 | A1 | 10/2002 | Kochner et al. |
| 2003/0070083 | A1 | 4/2003 | Nessler |
| 2003/0169885 | A1 | 9/2003 | Rinaldi |
| 2003/0220921 | A1 | 11/2003 | Fagin et al. |
| 2004/0034787 | A1 | 2/2004 | Kitani |
| 2004/0098593 | A1 | 5/2004 | Muratani |
| 2004/0111611 | A1 | 6/2004 | Jin et al. |
| 2004/0128259 | A1 | 7/2004 | Blakeley et al. |
| 2004/0133794 | A1 | 7/2004 | Kochner et al. |
| 2004/0153941 | A1 | 8/2004 | Muratani |
| 2005/0021568 | A1 | 1/2005 | Pelly |
| 2005/0097110 | A1 | 5/2005 | Nishanov et al. |
| 2005/0141704 | A1 | 6/2005 | Van Der Veen |
| 2005/0283610 | A1 | 12/2005 | Serret-Avila et al. |
| 2006/0056695 | A1 | 3/2006 | Wu et al. |
| 2006/0085343 | A1 | 4/2006 | Lisanke et al. |
| 2006/0136728 | A1 | 6/2006 | Gentry et al. |
| 2006/0239503 | A1 | 10/2006 | Petrovic et al. |
| 2006/0282676 | A1 | 12/2006 | Serret-Avila et al. |
| 2007/0067242 | A1* | 3/2007 | Lotspiech et al. ............... 705/57 |
| 2007/0067244 | A1 | 3/2007 | Jin et al. |
| 2007/0165853 | A1* | 7/2007 | Jin et al. ........................ 380/210 |
| 2007/0174637 | A1 | 7/2007 | Lotspiech et al. |

FOREIGN PATENT DOCUMENTS

| | | |
|---|---|---|
| WO | WO 00/48190 | 8/2000 |
| WO | WO 01/22406 | 3/2001 |
| WO | WO 03/090021 | 10/2003 |

OTHER PUBLICATIONS

U.S. Appl. No. 12/131,073, filed May 31, 2008, Bellwood et al.
U.S. Appl. No. 12/131,074, filed May 31, 2008, Lotspiech.
U.S. Appl. No. 12/131,076, filed May 31, 2008, Jin et al.
U.S. Appl. No. 12/143,061, filed Jun. 20, 2008, Jin et al.
U.S. Appl. No. 12/143,658, filed Jun. 20, 2008, Jin et al.
U.S. Appl. No. 12/192,962, filed Aug. 15, 2008, Jin et al.
Boneh et al., "Fully collusion resistant traitor tracing with short cipher texts and private keys," Eurocrypt '06, 2006, http://citeseer.ist.psu.edu./boneh06fully.html.
Celik et al., "Collusion-resilient fingerprinting using random prewarping," Image Processing, 2003, ICIP 2003, Proceedings, 2003 International Conference vol. 1, Sep. 14-17, 2003 pp. I-509-12, vol. 1.
Deguillaume et al., "Countermeasures for unintentional and intentional video watermarking attacks," Conference SPIE—Int. Soc. Opt. Eng. (USA), Jan. 24-26, 2000, vol. 3971, p. 346-357.
Fernandez-Munoz et al., "Fingerprinting schemes for the protection of multimedia distribution rights," Upgrade, Security in e-Commerce, v. III, n.6, pp. 36-40, Dec. 2002, http://www.cepis-upgrade.org/issues/2002/6/upgrade-vIII-6.pdf.
Hagiwara et al., "A short random fingerprinting code against a small number of pirates" Applied Algebra, Algebraic Algorithms and Error-Correcting Codes, $16^{th}$ International Symposium, AAEECC-16. Proceedings (Lecture Notes in Computer Science vol. 3857) pp. 193-202 (Feb. 2-24, 2006).
Kocher et al., "Self-protecting digital content," Technical Report from the CRI Content Security Research Initiative, Cryptography Research, Inc. (CRI), 2002-2003, http://www.cryptography.com/resources/whitepapers/SelfProtectingContent.pdf.
Pfitzmann et al., "Trials of traced traitors," (c) 1996 Workshop on Information Hiding, pp. 1-14.
Seol et al., "A scalable fingerprinting scheme for tracing traitors/colluders in large scale contents distribution environments," Intelligent Systems Design and Applications, 2005. ISDA 2005, Priceedings, $5^{th}$ International Conference Sep. 8-10, 2005 pp. 228-233.
Silverberg et al., "Application of list decoding to tracing traitors," a version of this paper appeared in ASIACRYPT 2001, 2001, http://www.math.unl.edu/-jwalker/papers/taipp.pdf.
Tardos G., "Optimal probabilistic fingerprint codes," Proceedings of the $35^{th}$ Annual ACM Symposium on Theory Computing, 2003, pp. 116-125.
Zhu et al., "Analysis on AACS traitor tracing against mix-and-match attacks," IEEE CCNC 2008, p. 1097.

* cited by examiner

TRAITOR DETECTION FOR MULTILEVEL ASSIGNMENT

BACKGROUND

The present invention relates to content protection systems, and more specifically, to traitor tracing in a multilevel assignment environment.

The transition of many types of media from analog to digital offers new advantages to the consumer in quality and flexibility. Also, there is an increasing use of global distribution systems such as the Internet for the distribution of digital assets, including music, film, computer programs, photographs, games and other content. These trends have made it easy to produce and distribute flawless copies of content by content providers. Unfortunately, there is also a concurrent increase in the unauthorized copying, or pirating, of digital content, which has caused considerable economic losses to content providers. Effective countermeasures are important to the viability of businesses engaged in the distribution of digital media.

Piracy is a major concern and expense for content providers. To this end, industry consortia such as the 4C Entity (<www.4centity.com>) and AACSLA (<www.aacsla.com>) have been formed. These groups are licensing agencies that provide content protection tools based on Content Protection for Recordable Media (CPRM) and Advanced Access Content System (AACS), respectively. CPRM is a technology developed and licensed by the 4C group, comprising IBM, Intel, Matsushita, and Toshiba, to allow consumers to make authorized copies of commercial entertainment content where the copyright holder for such content has decided to protect it from unauthorized copying. AACS is a follow-on technology for the same purpose, under development by a group comprising IBM, Intel, Matsushita, Toshiba, Sony, Microsoft, Warner Brothers, and Disney.

In the AACS content protection system, devices such as DVD players are assigned a set of keys and a common key is used to encrypt the content. A pirate attack in this system may occur when the attackers re-distribute the common content encrypting key or the plain content to avoid being identified. This type of an attack is called an anonymous attack. In an anonymous attack, an attacker, or group of attackers, tries to hide their secret device keys and operate anonymously. In this attack, the attackers instrument their devices and collude to build a pirate copy of the decrypted plaintext content or the decryption key itself. The attackers can then redistribute either the plaintext content, or the decryption key. Alternatively, the attackers may build a clone with built-in device keys and re-sell the clone box; this kind of attack is called a clone attack.

The devices (or the owners of the devices) who are involved in the piracy and redistribution for both clone and anonymous attacks are called traitors. Traitor tracing is the forensic technology used to identify the traitors who have been involved in the piracy attack. In order to do traitor tracing for anonymous attacks, content may be divided into multiple segments and some of the segments are chosen to have multiple variations. A digital watermark is one way to build these variations. More importantly, those variations are not only differently watermarked, but also differently encrypted. During playback, each device can only decrypt exactly one variation at each segment. The differently watermarked and encrypted variations effectively build different content versions. Each different playback path becomes one version. The recovered pirated variation of encrypting keys, or the movie version, can be linked back to the actual devices (i.e., traitors) who were assigned those versions.

There are some practical issues with the above-described traitor tracing system. First of all, because the variations take extra space on the disc, or bandwidth during communication, the number of variations cannot be large. However, in practice, the number of devices a system needs to accommodate may be very large, e.g., in the billions. These are conflicting requirements. To address this issue some prior systems utilize two level of assignment, namely an "inner code" and an "outer code". The inner code assigns the variation for each segment inside the content, which may be a movie. This assignment effectively creates multiple movie versions, each version becoming a symbol for the outer code assignment. The outer code assigns the movie versions (symbols) among a sequence of movies. This assignment solves the extra bandwidth requirement by having a small number of variations at each segment, while still managing to support a large number of devices.

A second practical issue relates to the actual traitor detection. The problem is that attackers collude in the attack and may mislead the tracing agency to erroneously incriminate innocent devices. The collusion attack creates an inherent difficulty in terms of tracing. After the above-described practical assignment is done, a straightforward approach to detect colluders might be to score every device and incriminate the highest scoring devices. In some prior systems, more efficient tracing algorithms are employed which use a set-cover algorithm to detect coalitions of pirates all together instead of one-by-one.

A set-cover detection technique is disclosed in U.S. patent application Ser. No. 11/323,247, which is incorporated by reference herein for all uses and purposes. The set-cover tracing can be used for any single level code. When used in a multi-level environment, for example, in a two level "inner code" and "outer code" environment, one can consider applying the set-cover tracing on the inner code first, and then on the outer code. The inner code tracing can identify which outer code symbol was used to create the pirate movie. This information becomes the input to the outer code tracing. This approach may be effective if the inner code tracing could always tell which outer symbol was used in creating a pirate movie. Unfortunately, in reality this is not always true. For example, when each segment comes with 16 variations inside a movie, i.e. symbol size is 16; k=2 to create 256 inner codewords. If there are 4-5 colluders mix-matching inside movie segments, the set-cover tracing on the inner code cannot tell which outer symbol was used and the system may be overwhelmed. Moreover, without information on which outer symbol was used in creating a movie copy, the set-cover tracing cannot be done on the outer code either. The system may then fail to catch any of the attackers even though there might be sufficient information to determine the identities of the attackers.

SUMMARY

According to one embodiment of the present invention, a method comprises: performing an inner code traitor tracing on a recovered pirated digital file, the recovered digital file incorporating an inner code for assigning segments of the digital file and an outer code for assigning inner codes to individual digital files; extracting partial information regarding the outer code from the inner code tracing; and performing an outer code tracing procedure using the partial information.

According to another embodiment of the present invention, a method comprises: recovering a set of pirated digital files, each having inner and outer codes in a multilevel concatenated assignment configuration; applying a set-cover tracing procedure on the inner code, thereby outputting a set of symbols; and applying a set-cover tracing on the outer code using the symbols to detect a traitor.

According to a further embodiment of the present invention, a system comprises: digital media; a digital file on the digital media, the digital file having a plurality of file segment variations and a multilevel concatenated assignment of inner and outer codes; and traitor tracing enabling component, the traitor tracing enabling component performing an inner code traitor tracing on a recovered pirated version of the digital file and extracting partial information regarding the outer code from the inner code tracing, the traitor tracing enabling component also performing an outer code tracing procedure using the partial information.

According to another embodiment of the present invention, a computer program product for traitor tracing comprises: a computer usable medium having computer usable program code embodied therewith, the computer usable program code comprising: computer usable program code configured to: perform an inner code traitor tracing on a recovered pirated digital file, the recovered digital file incorporating an inner code for assigning segments of the digital file and an outer code for assigning inner codes to individual digital files; extract partial information regarding the outer code from the inner code tracing; and perform an outer code tracing procedure using the partial information.

DETAILED DESCRIPTION

Figure 1:
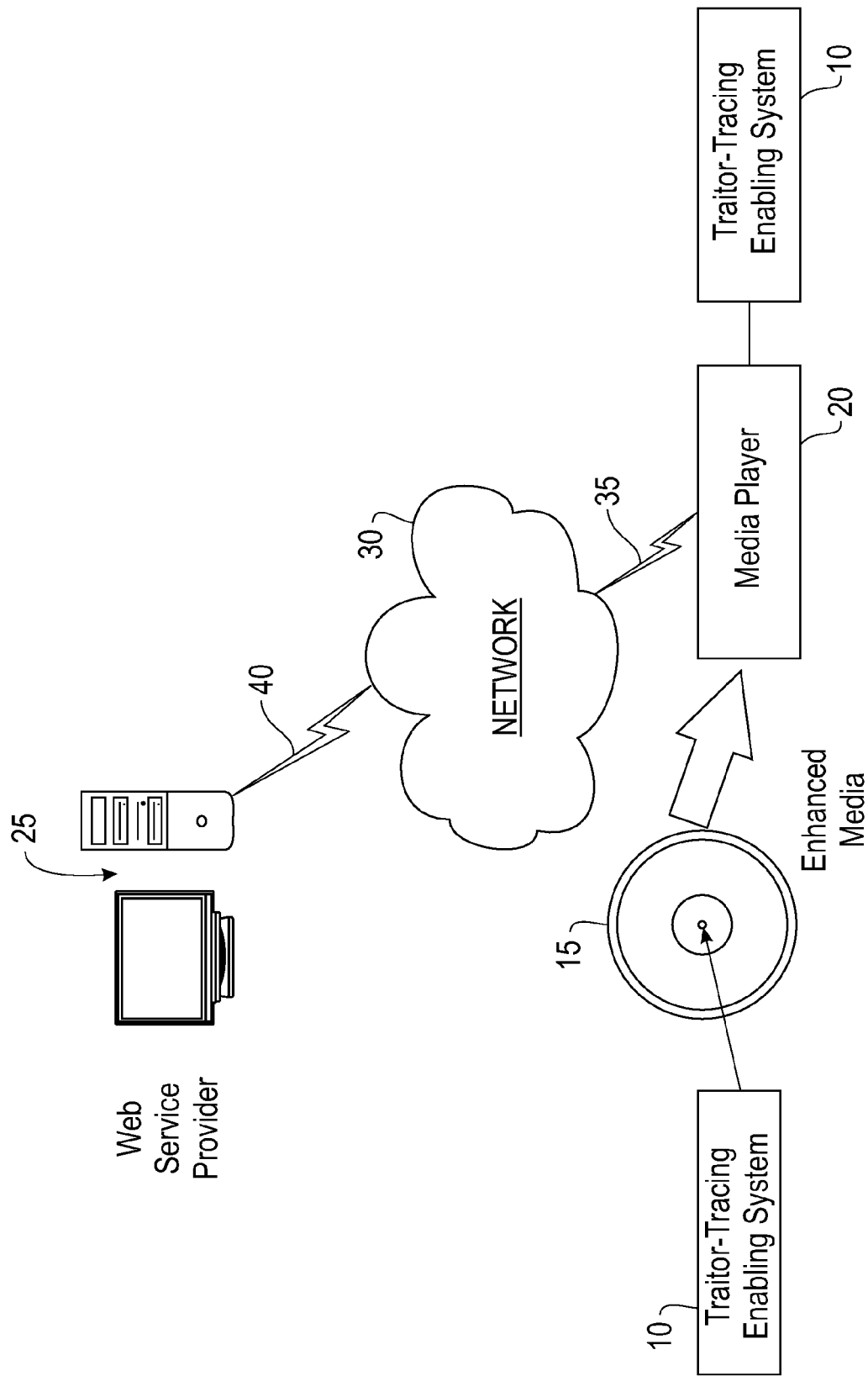
FIG. 1 is a diagram of an exemplary operating environment in which embodiments of a traitor tracing system of the present invention can be used.
Figure 2:
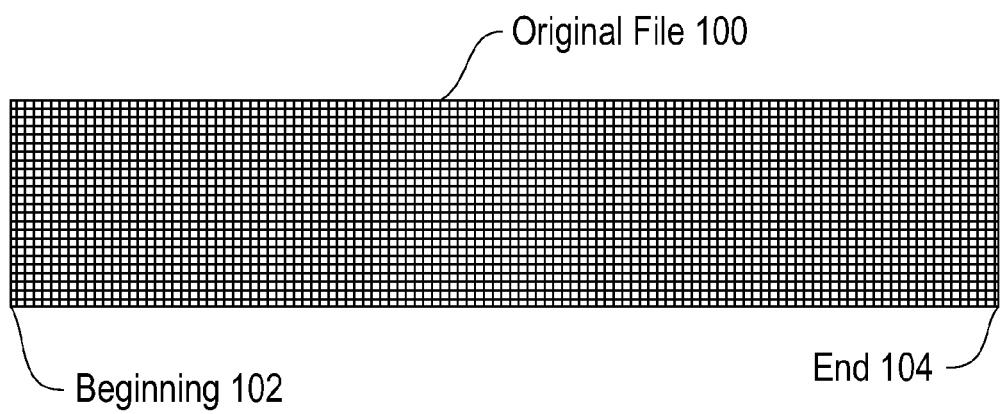
FIG. 2 is a diagram of an original file, according to an embodiment of the present invention.
Figure 3:
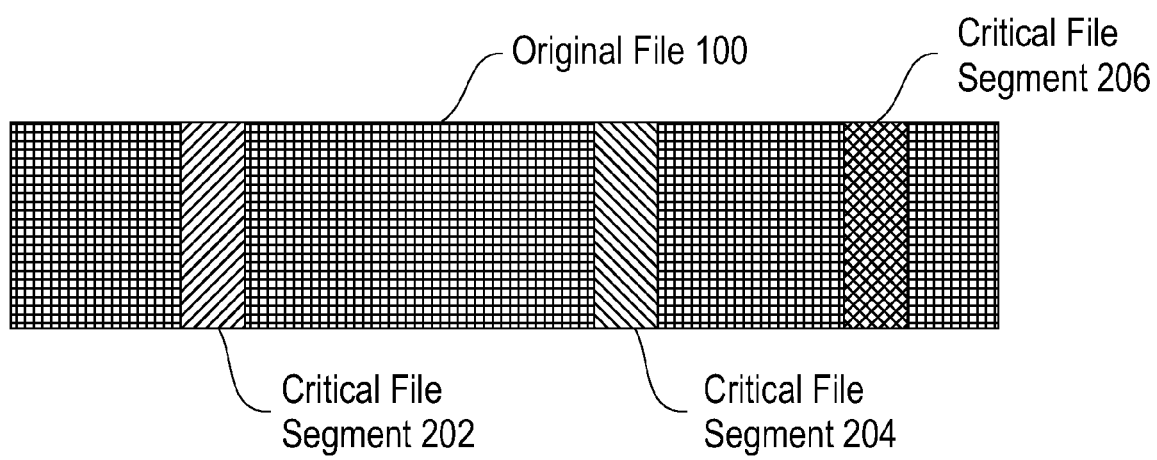
FIG. 3 is a diagram of a critical file segment in an original file, according to an embodiment of the present invention.
Figure 4A:
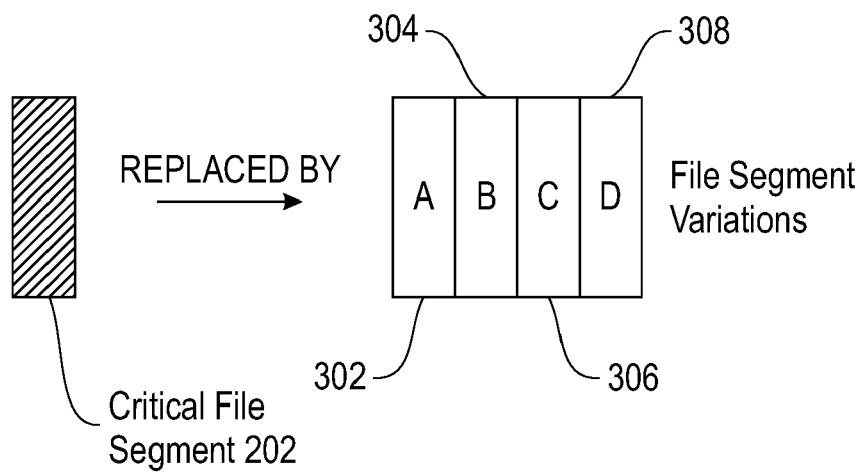
FIGS. 4A, 4B, and 4C are diagrams of file segment variations that will replace critical file segments, according to an embodiment of the present invention.
Figure 4B:
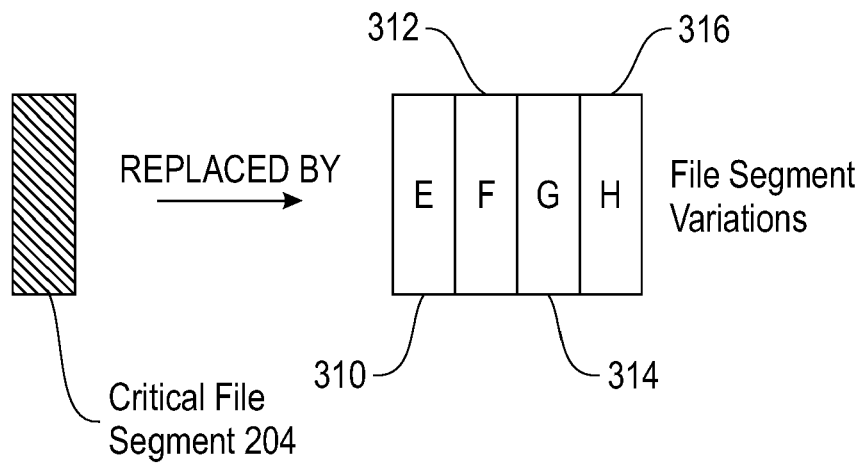
Figure 4C:
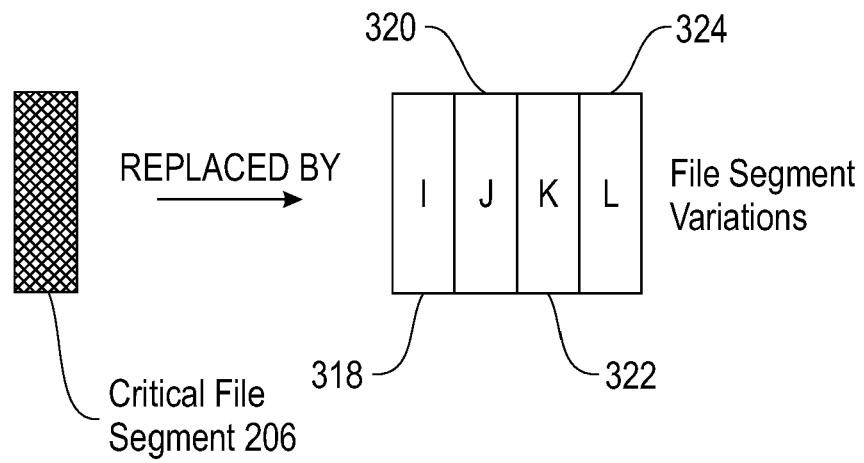
Figure 5:
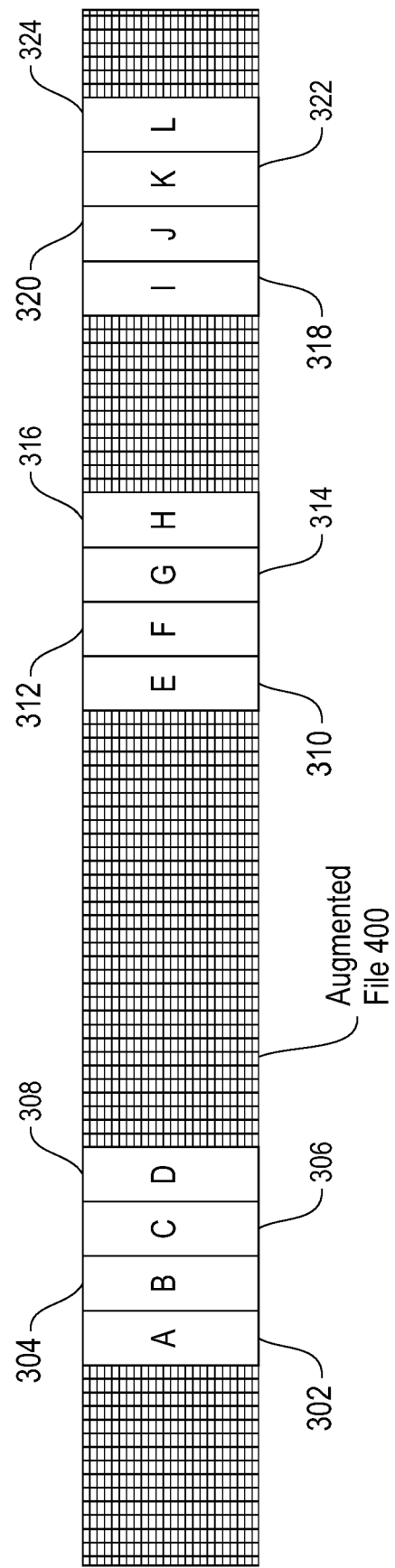
FIG. 5 is a diagram of an augmented version of a file including file segment variations, according to an embodiment of the present invention.

Embodiments of the invention provide an efficient way to detect traitors in a mix-match type of attack on the inner level code in a multilevel concatenated assignment environment. Prior systems, which required the inner code to identify correct symbols to the outer level code, have a number of disadvantages. This prior approach can be considered to be overkill in multi-level tracing and it makes the detection system vulnerable to the mix-match type attack on the inner code. Embodiments of the present invention forgo this requirement and instead perform traitor tracing in multi-level nested codes using partial information from the inner code decoding. In particular, embodiments of the invention generalize the prior set-cover tracing method to allow for nested codes tracing. The simple method of applying set-cover tracing on each level one-by-one can be regarded as a special case of the tracing method of aspects of the present invention. That is, the information passed to the outer code decoding is the actual set of symbols expected to form the attacking set. In situations where this information cannot be determined, some embodiments identify useful partial information that can be passed to the outer code to enable continued tracing of the outer code, which cannot be done in current techniques. The result is a significant improvement in the traitor detection capability of a traitor tracing system with multi-level assignments.

The set-cover tracing technique described in the incorporated-by-reference U.S. patent application Ser. No. 11/323,247 can be used for any single level coding. When this technique is used in a multi-level environment, for example, in a two level "inner code" and "outer code" environment, one can apply the set-cover tracing first on the inner code first, and then on the outer code. The inner code tracing may identify which outer code symbol was used in the piracy. This information becomes the input to the outer code tracing. This set-cover technique can work if the inner code tracing can always tell which outer symbol was used in creating a pirate movie.

Unfortunately this is not always true. For example, with 4-5 colluders mix-matching inside movie segments when the code symbol size is 16, the set-cover tracing on the inner code cannot tell which outer symbol was used. The system may be overwhelmed. Without information on which outer symbol was used in creating a movie copy, the set-cover tracing cannot be done on the outer code either.

Embodiments of the present invention address this problem by avoiding the need to deterministically output an outer code symbol to the outer code tracing. Instead, for each recovered movie, embodiments may identify useful partial information that can be obtained from the inner code to feed into outer code to enable continued outer code tracing. In some embodiments, this partial information can be in the form of a score corresponding to how many inner code segments each outer code symbol matches with. In other embodiments, this partial information can be in the form of a probabilistic value indicating how likely it is for a particular outer code symbol to have been part of the attacking set. In additional embodiments, the inner code tracing can also just output the locations of the inner code symbols where each outer code symbol matches in the pirated movie. In each case, this partial information can then be used to perform tracing on the outer code and determine attackers.

These embodiments may be illustrated with representative instantiations using a two-level code as an example. The inner code has parameters $n_1$, $k_1$, $q_1$, and outer code $n_2$, $k_2$, $q_2$. Assume that m pirated movies have been recovered and there are T colluders. Three situations will be discussed.

In the first situation (the best case scenario), for each movie, we can uniquely (with high confidence) identify which set of symbols was used to create that attacked movie. In this case, the set of symbols used to create the attacked movie is used for the outer code decoding. This would correspond to the case of applying the set-cover tracing algorithm on the inner and outer levels separately, as discussed above.

In the second situation, we are unable to determine with high confidence which set of symbols was used to create the attacked movie. In this situation, an embodiment of the invention is configured such that the inner code decoding process outputs, for each movie, the number of inner code symbols each outer code symbol matches with. This number is a score that is an indicator of how likely it is that a particular outer code symbol was part of the attacking set. This information is then used to determine the attackers.

In more detail, in this embodiment of the invention, the overall tracing may be accomplished using the following three steps:

1. For each movie, first count the number of segments each outer code symbol matches with. This information is provided to the outer code decoder.
2. Create a matrix A which has m rows and N columns (where N can correspond to the total number of users or a shortlist of suspects). Each column corresponds to one suspect and each row corresponds to one movie. Consider the ith column of matrix A. The ith column contains the following information. The first entry is the number of inner code symbols the ith suspect's first outer code symbol matches (corresponding to the first movie). The second entry is the number of inner code symbols the ith suspect's second outer code symbol matches (corresponding to the second movie) and so on. Note that if this entire matrix is divided by the length of inner code=n1, then each entry is proportional to the probability that the user has contributed his symbol to forming the ith attacked movie.
3. Solve the following integer programming problem (conceptually this is equivalent to finding a set-cover to explain the recovered movies):
minimize the inner product of ([1 1 1 1 ... 1] and c) subject to the constraint that each element of A×c is greater than n1, where c is a binary vector of length N, and where a 1 in the ith position indicates that the ith suspect belongs to the coalition.

We can solve this integer programming problem by first sorting the columns in terms of total sum (score) and then checking if there is any one suspect who can satisfy the constraint, and then any two suspects, and so on. Note that this embodiment can provide multiple solutions, all of which may not cover the observed sequence since we have not retained detailed positional information. One simple solution to address this issue is to then verify which of the solutions actually covers the observed symbol sequence.

Turning now to the third situation, we address the situation where, as in the second situation discussed above, we are also unable to determine, with high confidence, the set of outer code symbols used to create the attacked movies. In this situation, in accordance with an additional embodiment of the invention, the inner code decoding outputs the positions of the segments in which each outer code symbol matches. These positions are then used to determine the identities of the attackers. In this embodiment, the overall tracing can be performed using the following three steps:

1. For each movie, the inner code outputs the positions of the segments where each outer code symbol matches.
2. Form a binary matrix with m×n1 rows and N columns corresponding to the m recovered movies where each movie has n1 segments. Each column would correspond to one suspect. The (j,i)th entry is 1 if the nested code symbol of the ith suspect matches the jth segment observed from the attacked movies.
3. The set of colluders can then be found by solving the following integer programming problem (as in embodiment two, conceptually this process is equivalent to finding a set-cover to explain the recovered movies):
minimize the inner product of ([1 1 1 1 ... 1] and c) subject to the constraint that each element of A×c is greater than 1, where c is a binary vector of length N, and where a 1 in the ith position indicates that the ith suspect belongs to the coalition.

This problem can be solved by first sorting the columns in terms of total sum (score) and then checking if there is any one suspect who can satisfy the constraint, and then any two, and so on.

Figure 6:
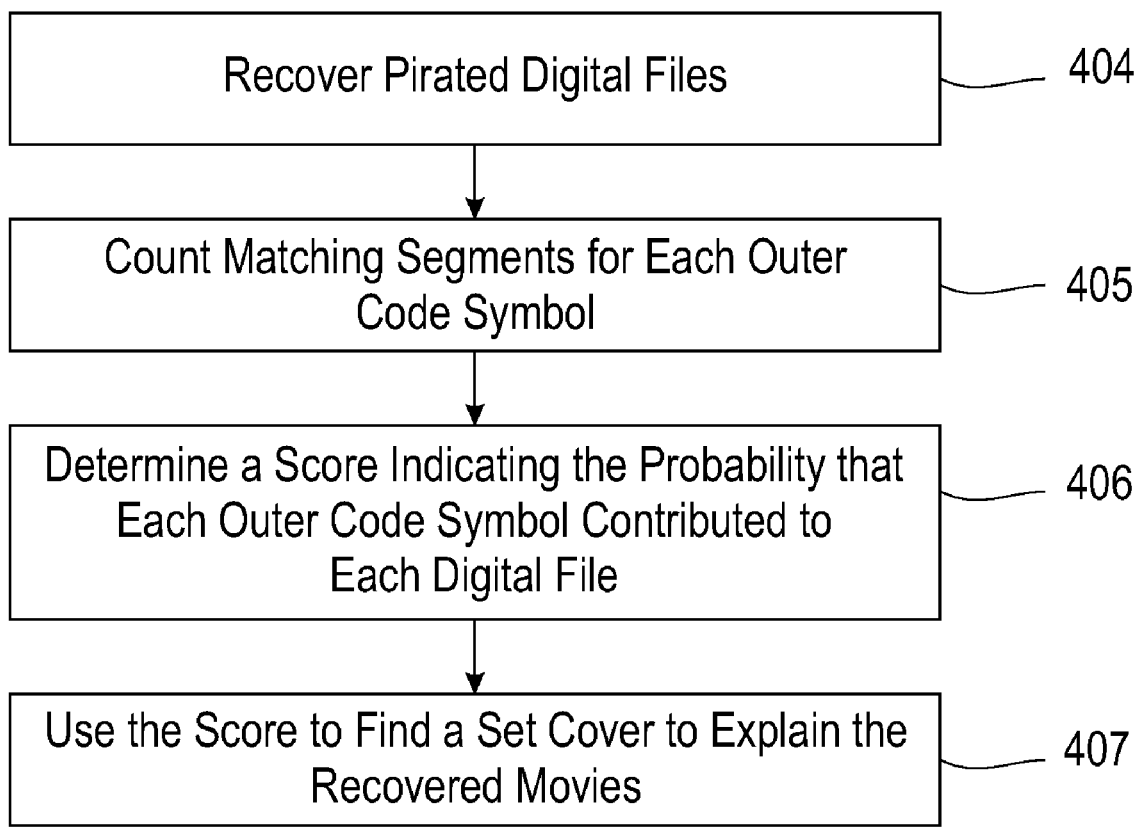
FIG. 6 is a flowchart of a method of traitor tracing in accordance with an embodiment of the invention.

Referring now to FIG. 6, a traitor tracing process 402 in accordance with an embodiment of the invention is shown. In step 404 a set of pirated digital files are recovered. Matching segments for each outer code symbol are counted in step 405. That is, the number of segments each outer code matches are counted. In step 406, a score is determined which indicates the probability that each outer code symbol contributed to each digital file. This may be done, for example, by creating the matrix A and solving the integer programming problem described in connection with the second situation described above. In step 407, this score is then used to find a set-cover to explain the recovered movies. Appropriate action may then be taken against the traitors, such as revoking their players and/or legal action.

Figure 7:
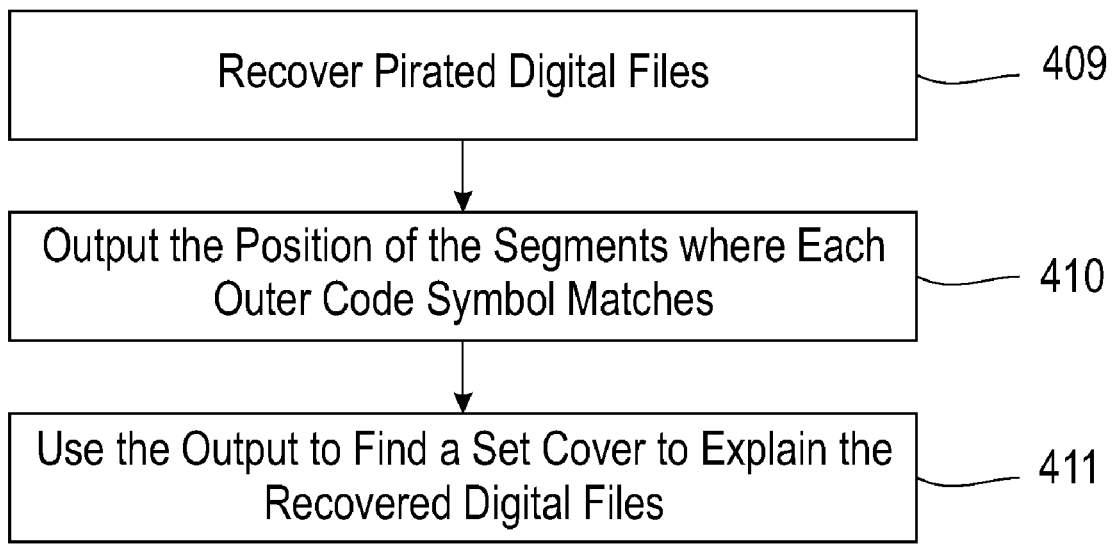
FIG. 7 is a flowchart of a method of traitor tracing in accordance with another embodiment of the invention.

FIG. 7 shows a procedure 408 for traitor tracing in accordance with embodiments of the invention. In step 409, a pirated digital file is recovered. In step 410, the position of the segments where each outer code symbol matches is then determined and outputted. In some embodiments, this may comprise performing the three steps used in the third situation discussed above. In step 411, this output is then used to find a set-cover to explain the recovered digital files.

From the foregoing it can be seen that in accordance with the above discussed embodiments of the invention, the decoding procedure is generalized to allow partial information, which may be passed to the outer level decoding. As a result, we can detect attackers in cases where the simple method of applying set-cover decoding to each level of the code would fail. In other words, embodiments of the invention use some information about the outer code symbol derived from the inner code tracing (be it the "score" or the probability of a particular outer code symbol being used to create that part of the movie, or the set of outer code symbols constituting the attacking set) and then use that information in the outer code tracing to catch attackers. Making use of some information from the inner code tracing may allow a tracing system to trace an increased number of traitors in a multi-level code assignment situation, and also to avoid being overwhelmed easily during inner code tracing as a result of attacks on the inner code, such as mix-and-match attacks. Those skilled in the art will appreciate that the present invention can be extended to cases where there are more than two levels of codes.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
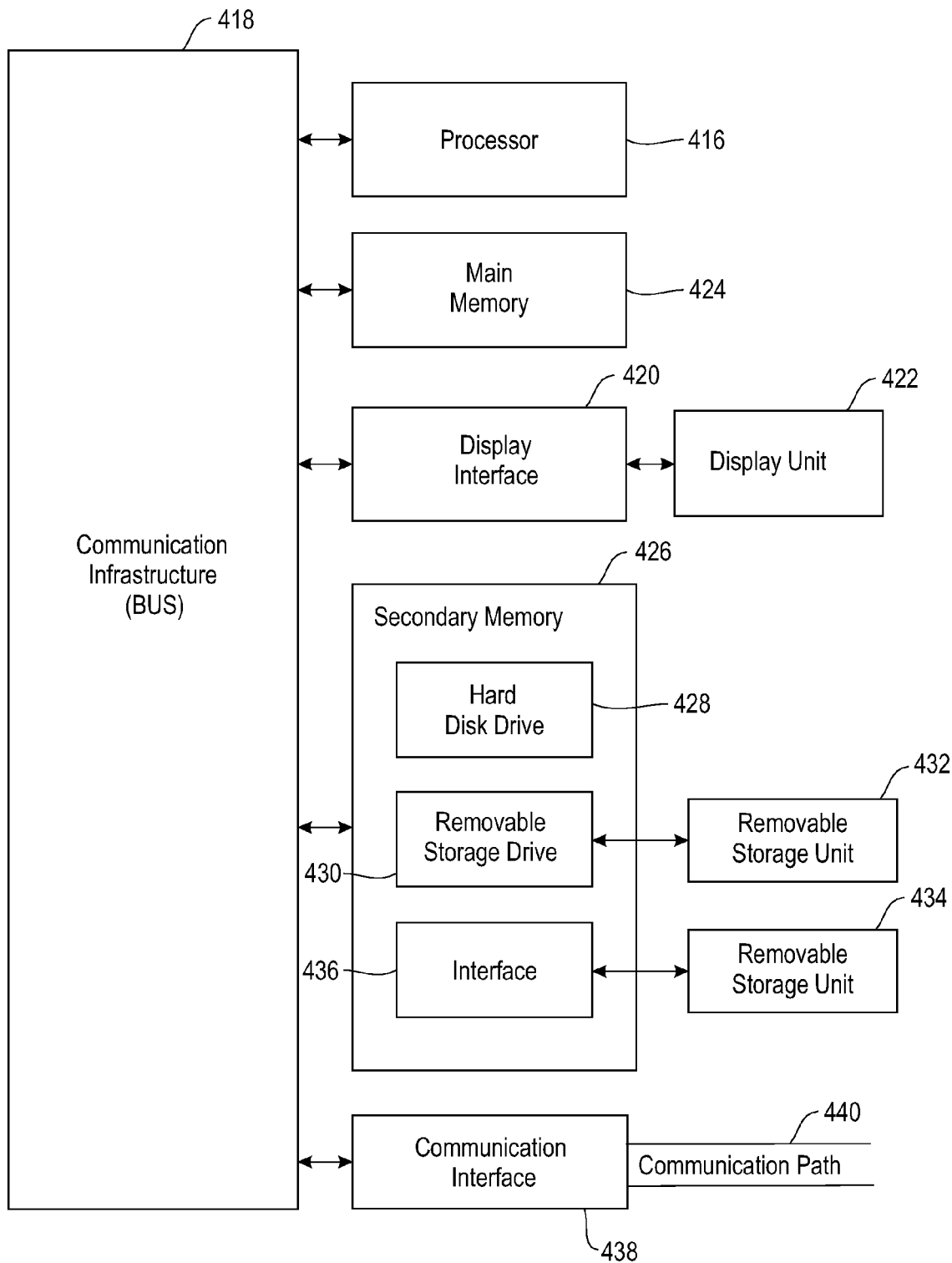
FIG. 8 is a high level block diagram of an information processing system useful for implementing one embodiment of the present invention.

FIG. 8 is a high level block diagram showing an information processing system useful for implementing one embodiment of the present invention. The computer system includes one or more processors, such as processor 416. The processor 416 is connected to a communication infrastructure 418 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 420 that forwards graphics, text, and other data from the communication infrastructure 418 (or from a frame buffer not shown) for display on a display unit 422. The computer system also includes a main memory 424, preferably random access memory (RAM), and may also include a secondary memory 426. The secondary memory 426 may include, for example, a hard disk drive 428 and/or a removable storage drive 430, representing, for example, a floppy disk drive, a magnetic tape drive, or an optical disk drive. The removable storage drive 430 reads from and/or writes to a removable storage unit 432 in a manner well known to those having ordinary skill in the art. Removable storage unit 432 represents, for example, a floppy disk, a compact disc, a magnetic tape, or an optical disk, etc. which is read by and written to by removable storage drive 430. As will be appreciated, the removable storage unit 432 includes a computer readable medium having stored therein computer software and/or data.

In alternative embodiments, the secondary memory 426 may include other similar means for allowing computer programs or other instructions to be loaded into the computer system. Such means may include, for example, a removable storage unit 434 and an interface 436. Examples of such means may include a program cartridge and cartridge interface (such as that found in video game devices), a removable memory chip (such as an EPROM, or PROM) and associated socket, and other removable storage units 434 and interfaces 436 which allow software and data to be transferred from the removable storage unit 434 to the computer system.

The computer system may also include a communications interface 438. Communications interface 438 allows software and data to be transferred between the computer system and external devices. Examples of communications interface 438 may include a modem, a network interface (such as an Ethernet card), a communications port, or a PCMCIA slot and card, etc. Software and data transferred via communications interface 438 are in the form of signals which may be, for example, electronic, electromagnetic, optical, or other signals capable of being received by communications interface 438. These signals are provided to communications interface 438 via a communications path (i.e., channel) 440. This channel 440 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 424 and secondary memory 426, removable storage drive 430, and a hard disk installed in hard disk drive 428.

Computer programs (also called computer control logic) are stored in main memory 424 and/or secondary memory 426. Computer programs may also be received via communications interface 438. Such computer programs, when executed, enable the computer system to perform the features of the present invention as discussed herein. In particular, the computer programs, when executed, enable the processor 416 to perform the features of the computer system. Accordingly, such computer programs represent controllers of the computer system.

From the above description, it can be seen that the present invention provides a system, computer program product, and method for implementing the various embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    recovering a set of pirated digital files, each of said set of pirated digital files having inner codes and outer codes in a multilevel concatenated assignment configuration, wherein:
    each of said inner codes assigns segment variations to at least one of said pirated digital files, and
    each of said outer codes assigns said inner codes to devices in a content protection system;
    performing an inner code traitor tracing on one of said pirated digital files;
    extracting partial information regarding symbols of outer code among said outer codes from said inner code traitor tracing, wherein said extracting comprises determining a count score corresponding to a count of how many segments in each of said pirated digital files match with each of said outer code symbols; and
    performing an outer code tracing procedure using said partial information of said outer code symbols, wherein said performing outer code tracing comprises:
    creating a matrix which having m rows and N columns, where m is a number of recovered digital files and N is a set of potential pirates, wherein each entry [j,i] contains said count score for a user i and a pirated digital file j; and
    determining which of said set of potential pirates satisfy a predetermined minimizing constraint on said matrix.

2. A method according to claim 1 wherein said performing an inner code tracing and performing an outer code tracing each comprise performing a set-cover tracing procedure.

3. A method according to claim 1 wherein each of said set of pirated digital files incorporates a mix-match anonymous attack.

4. A method according to claim 1 wherein each of said set of pirated digital files includes at least one of: a movie, an audio file, a video game, and a computer program.

5. A non-transitory computer program product comprising a computer readable storage medium having computer readable program code embodied therewith, the computer readable program code comprising:
    computer usable program code configured to recover a set of pirated digital files, each of said set of pirated digital files having inner codes and outer codes in a multilevel concatenated assignment configuration, wherein:
    each of said inner codes assigns segment variations to at least one of said pirated digital files, and
    each of said outer codes assigns said inner codes to devices in a content protection system;
    computer usable program code configured to perform an inner code traitor tracing on one of said pirated digital files;
    computer usable program code configured to extract partial information regarding symbols of outer code among said outer codes from said inner code traitor tracing, wherein said extract comprises determining a count score corresponding to a count of how many segments in each of said pirated digital files match with each of said outer code symbols; and
    computer usable program code configured to perform an outer code tracing procedure using said partial information of said outer code symbols, wherein said perform outer code tracing comprises:
    creating a matrix which having m rows and N columns, where m is a number of recovered digital files and N is a set of potential pirates, wherein each entry [j,i] contains said count score for a user i and a pirated digital file j; and determining which of said set of potential pirates satisfy a predetermined minimizing constraint on said matrix.

6. The computer program product according to claim 5 wherein said perform an inner code tracing and said perform an outer code tracing each comprise performing a set-cover tracing procedure.

7. The computer program product according to claim 5 wherein each of said set of pirated digital files incorporates a mix-match anonymous attack.

8. The computer program product according to claim 5 wherein said extract comprises determining a probabilistic value based on said count score, wherein the probabilistic value indicates how likely that each of said outer code symbols contributed to each of said pirated digital files.

9. The computer program product according to claim 8 wherein said performing outer code tracing comprises:
    creating a matrix which having m rows and N columns, where m is a number of recovered digital files and N is a set of potential pirates, wherein each entry [j,i] contains said probabilistic value for a user i and a pirated digital file j; and
    determining a position of segments in said pirated digital file where each of said outer code symbol matches corresponds with said inner code.

10. The computer program product according to claim 5 wherein said performing outer code tracing comprises:
    creating a matrix which having m*n1 rows and n columns, wherein:
        m is the number of said recovered digital files,
        n1 is the number of segments in each of said recovered digital file,
        m*n1 is a total number of segments from the recovered digital files,
        each of the n columns represents one suspected pirate, and
        each of said entry [j,i] is 1 if jth symbol of nested code word of said user i matches the jth segment of said recovered digital files; and
    determining which of said set of potential pirates satisfy the predetermined minimizing constraint on said matrix.

11. The computer program product according to claim 5 wherein each of said set of pirated digital files includes at least one of: a movie, an audio file, a video game, and a computer program.

12. A method comprising:
    recovering a set of pirated digital files, each of said set of pirated digital files having inner codes and outer codes in a multilevel concatenated assignment configuration, wherein:
    each of said inner codes assigns segment variations to at least one of said pirated digital files, and
    each of said outer codes assigns said inner codes to devices in a content protection system;
    performing an inner code traitor tracing on one of said pirated digital files;
    extracting partial information regarding symbols of outer code among said outer codes from said inner code traitor tracing, wherein said extracting comprises:
    determining a count score corresponding to a count of how many segments in each of said pirated digital files match with each of said outer code symbols,
    determining a probabilistic value based on said count score, wherein the probabilistic value indicates how likely that each of said outer code symbols contributed to each of said pirated digital files,
    creating a matrix which having m rows and N columns, where m is a number of recovered digital files and N is a set of potential pirates, wherein each entry [j,i] contains said probabilistic value for a user i and a pirated digital file j, and
    determining a position of segments in said pirated digital file where each of said outer code symbol matches corresponds with said inner code; and
    performing an outer code tracing procedure using said partial information of said outer code symbols.

13. A method comprising:
    recovering a set of pirated digital files, each of said set of pirated digital files having inner codes and outer codes in a multilevel concatenated assignment configuration, wherein:
    each of said inner codes assigns segment variations to at least one of said pirated digital files, and
    each of said outer codes assigns said inner codes to devices in a content protection system;
    performing an inner code traitor tracing on one of said pirated digital files;
    extracting partial information regarding symbols of outer code among said outer codes from said inner code traitor tracing; and
    performing an outer code tracing procedure using said partial information of said outer code symbols, wherein said performing outer code tracing comprises:
    creating a matrix which having m*n1 rows and n columns, wherein:
        m is a number of recovered digital files,
        n1 is a number of segments in each of said recovered digital file,
        m*n1 is a total number of segments from the recovered digital files,
        each of the n columns represents one suspected pirate, and
        each entry [j,i] is 1 if jth symbol of nested code word of user i matches jth segment of said recovered digital files; and
    determining which of a set of potential pirates satisfy a predetermined minimizing constraint on said matrix.

* * * * *